May 10, 1927.

W. H. WILLIAMS

LIGHT CONTROL

Filed June 11, 1926

W. H. Williams
INVENTOR

BY Victor J. Evans
ATTORNEY.

May 10, 1927.
W. H. WILLIAMS
LIGHT CONTROL
Filed June 11, 1926
1,628,567
2 Sheets-Sheet 2
Fig. 2.
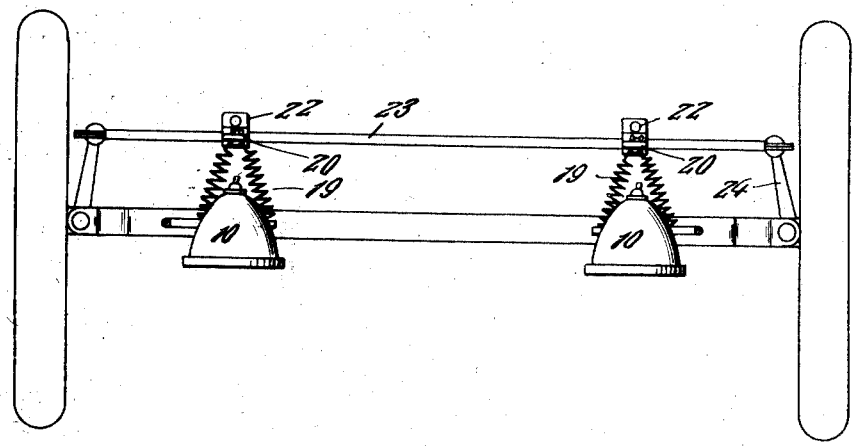
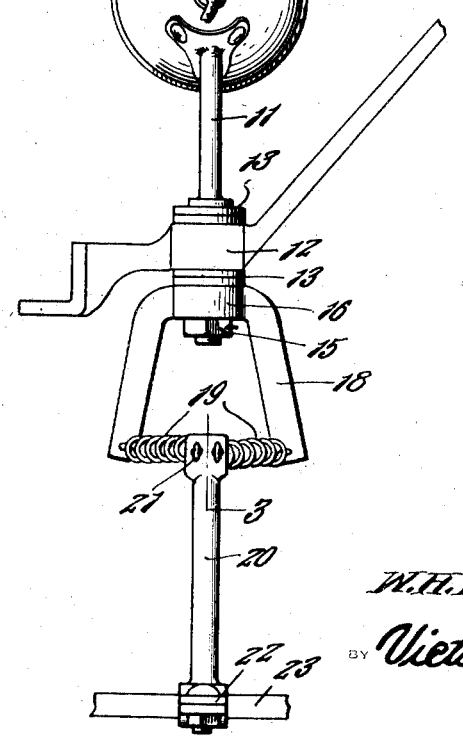
Fig. 6.
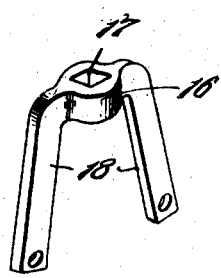
Fig. 5.
W. H. Williams
INVENTOR
BY Victor J. Evans
ATTORNEY Patented May 10, 1927.

1,628,567

UNITED STATES PATENT OFFICE.

WILLIAM HARROLD WILLIAMS, OF MARLIN, TEXAS.

LIGHT CONTROL.

Application filed June 11, 1926. Serial No. 115,321.

This invention relates to improvements in head lamps for automobiles and has for an object the provision of means for controlling the position of the lamps in accordance with the position of the steering wheels of the automobile, so that the beams of light from the lamps will at all times be projected in advance and in the direction of travel of the vehicle.

Another object of the invention is the provision of novel means for connecting the lamps with the steering knuckle connecting rod of the automobile in a manner to insure proper control of the lamps.

With the above and other objects in view, the invention further includes the following novel features and details of construction, to be hereinafter more fully described, illustrated in the accompanying drawings and pointed out in the appended claim.

In the drawings:—

Figure 2 is a fragmentary plan view partly in section.

Figure 5 is a fragmentary rear elevation showing the invention.

Figure 6 is a detail perspective view of one of the yokes.

Figure 1:
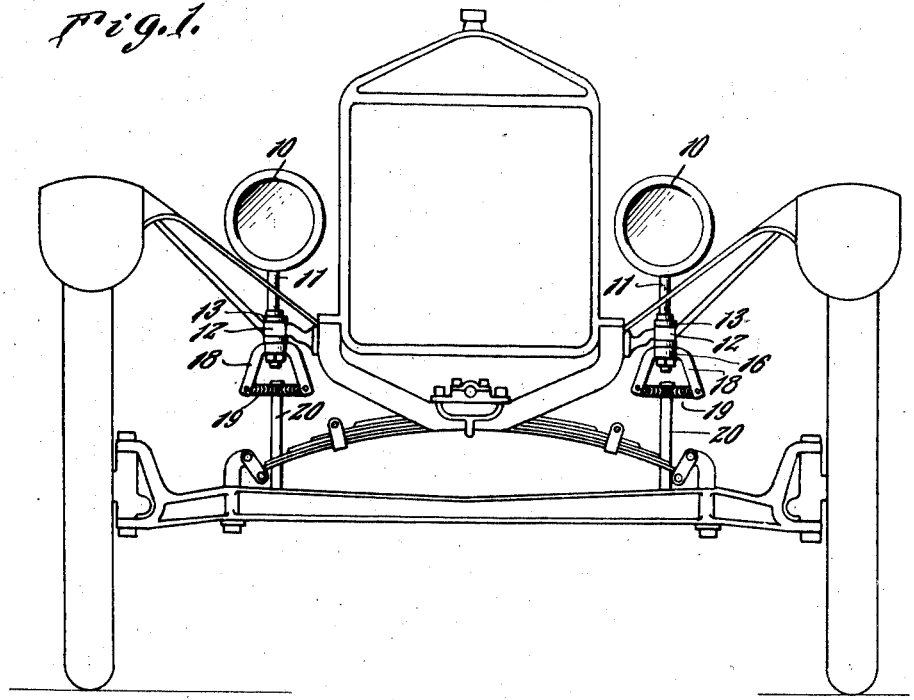
Figure 1 is a front elevation showing a portion of an automobile with the invention applied.
Figure 4:
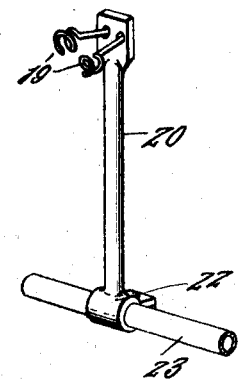
Figure 4 is a detail perspective view of a portion of the steering knuckle connecting rod with one of the vertically disposed arms attached.
Figure 3:
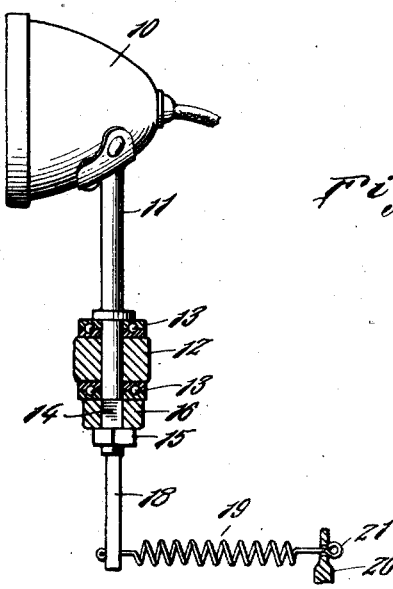
Figure 3 is a vertical sectional view taken substantially on the line 3—3 of Figure 5.

Referring to the drawings in detail wherein like characters of reference denote corresponding parts, the reference character 10 indicates a pair of head lamps which may be of the usual or any preferred construction and which are shown as mounted upon posts 11. These posts are of suitable length and may be supported in any suitable manner, the character of the support being governed by the particular make of automobile to which the invention is applied. In the present case the posts are shown as mounted for rotation in bracket arms 12 and are provided with upper and lower anti-friction bearings 13, so that the posts may be easily rotated.

The lower ends of the posts 11 are cross sectionally rectangular as shown at 14 and secured upon these rectangular ends by nuts 15, are yokes 16, the latter being provided with openings 17 which are shaped to conform to the shape of the portion 14 of the posts. The yokes 16 include downwardly extending laterally disposed spaced arms 18 and connected to the outer ends of these arms are coiled springs 19. The springs 19 are also connected to the upper ends of vertically disposed arms 20, as indicated at 21. The lower ends of the arms 20 are clamped as shown at 22 upon the rod 23 which connects the steering knuckle arms 24, the rod 23 and arms 24 being a part of the usual steering mechanism of an automobile.

It will be apparent from the foregoing description and accompanying drawings that when the automobile is traveling straight ahead, the lamps will be positioned to project the light straight ahead of the automobile. When the steering wheels are operated to change the direction of travel, the lamps 10 will be moved pivotally in the direction in which the vehicle is being steered. This is due to the longitudinal movement of the rod 23, which movement carries with it the arms 20 and causes the lamps to be moved pivotally. As the lamps are supported by the anti-friction bearings 13, practically no additional strain will be imparted to the steering mechanism and no additional power required to operate said mechanism.

The invention is susceptible of various changes in its form, proportions and minor details of construction and the right is herein reserved to make such changes as properly fall within the scope of the appended claim.

Having described the invention what is claimed is:—

A dirigible headlight for automobiles comprising a vertically disposed rotatably mounted post, a lamp at the upper end of the post, a bearing bracket for supporting the post, a squared extension upon the lower end of the post, an inverted substantially U-shaped member having a squared socket therein for receiving the squared extension of the post, and providing downwardly extending spaced integral arms, a vertically disposed arm having its lower end connected to the steering knuckle connecting rod and springs, each having one of their ends secured to the upper end of said rod and their other ends secured to the free ends of the arms of the U-shaped member, whereby movement of the steering knuckle connecting rod will move said post pivotally.

In testimony whereof I affix my signature.

WILLIAM HARROLD WILLIAMS.